United States Patent
Tsuji et al.

(10) Patent No.: US 7,306,237 B2
(45) Date of Patent: Dec. 11, 2007

(54) SEALING MATERIAL FOR ANT GROOVE

(75) Inventors: Kazuaki Tsuji, Gojo (JP); Tsutomu Yoshida, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 36 days.

(21) Appl. No.: 10/549,394

(22) PCT Filed: Mar. 26, 2004

(86) PCT No.: PCT/JP2004/004323

§ 371 (c)(1),
(2), (4) Date: Oct. 17, 2005

(87) PCT Pub. No.: WO2004/092619

PCT Pub. Date: Oct. 28, 2004

(65) Prior Publication Data

US 2006/0097461 A1    May 11, 2006

(30) Foreign Application Priority Data

Apr. 14, 2003   (JP) .............................. 2003-109446

(51) Int. Cl.
*F16J 15/02*   (2006.01)
(52) U.S. Cl. ..................................... 277/644
(58) Field of Classification Search ................ 277/630, 277/637, 639, 641, 642, 644
See application file for complete search history.

(56) References Cited

U.S. PATENT DOCUMENTS

| | | | | |
|---|---|---|---|---|
| 3,061,321 A | * | 10/1962 | Smith | .......................... 277/637 |
| 3,263,961 A | * | 8/1966 | Varga | .......................... 251/332 |
| 3,558,097 A | * | 1/1971 | DeFrees | ...................... 251/88 |
| 3,575,431 A | * | 4/1971 | Bryant | ........................ 277/641 |
| 3,630,485 A | * | 12/1971 | Williams | .................... 251/307 |
| 3,909,017 A | * | 9/1975 | Engstrom | .................... 277/586 |
| 4,192,520 A | * | 3/1980 | Hasegawa | .................... 277/591 |
| 4,254,960 A | * | 3/1981 | Jelinek | ........................ 277/644 |
| 4,897,963 A | * | 2/1990 | Reboul et al. | ................ 49/507 |
| 5,482,297 A | | 1/1996 | Burns et al. | |
| 5,511,518 A | * | 4/1996 | Jain et al. | ................. 123/90.37 |

(Continued)

FOREIGN PATENT DOCUMENTS

CN           1407260 A        4/2003

(Continued)

*Primary Examiner*—Patricia Engle
*Assistant Examiner*—Gilbert Lee (57) ABSTRACT

There is disclosed a sealing material for an ant groove, wherein the sealing material is easy to fit to the ant groove and little involves a phenomenon such that the sealing material unfavorably slips out of the ant groove in the form of remaining fixing to the opposite member when the sealed place is opened, and wherein the sealing material can exercise the good sealing function. The sectional shape of the sealing material has: a straight bottom edge 34 which is disposed on a bottom face of the ant groove 12; an arched convex edge 31 which contacts with the other member 20; a first projecting edge 33 which projects outside; a concave inlet portion 39; a second projecting edge which is composed of straight lines 35, 36 that project outside; a straight sloping edge 38; and at least one corner portion 37a-c which is constituted in the range of from the straight bottom edge 34 via the second projecting edge 35, 36 to the sloping edge 38.

9 Claims, 5 Drawing Sheets

U.S. PATENT DOCUMENTS

| | | | |
|---|---|---|---|
| 5,513,674 A * | 5/1996 | Frisch | 137/625.69 |
| 6,065,757 A * | 5/2000 | Schneider et al. | 277/641 |
| 6,328,316 B1 * | 12/2001 | Fukuhara et al. | 277/644 |
| 6,523,833 B1 * | 2/2003 | Ishigaki et al. | 277/650 |
| 6,854,739 B2 * | 2/2005 | Schleth et al. | 277/642 |
| 6,932,354 B2 * | 8/2005 | Kane et al. | 277/608 |

FOREIGN PATENT DOCUMENTS

| | | |
|---|---|---|
| JP | 9-510286 A | 10/1997 |
| JP | 2002-039392 A | 2/2002 |
| JP | 2002-130481 A | 5/2002 |
| JP | 2003-014126 A | 1/2003 |

* cited by examiner

SEALING MATERIAL FOR ANT GROOVE

This application is the National Stage of International Application No. PCT/JP04/04323, filed Mar. 26, 2004, which was published in English as International Patent Publication WO 2004/092619 A1 on Oct. 28, 2004, which is entitled to the right of priority of Japanese Patent Application 2003-109446, filed Apr. 14, 2003.

TECHNICAL FIELD

The present invention relates to a sealing material for an ant groove. In detail, what the present invention is to provide is a sealing material used for sealing a joint place between members by being fitted to the joint place in such as vacuum apparatus and piping instruments to which high airtightness is demanded.

BACKGROUND ART

There are known arts in which an ant groove having a trapezoidal sectional shape is utilized as a sealing structure in a sealed place required to have airtightness.

The ant groove structure has a merit such that the fitted sealing material little falls off. The ant groove structure is assumed to be a structure suitable for such as gate valves which repeat their opening and closing.

There are proposed various arts of improving the shape or structure of the sealing material in order to enhance performances such as airtightness as to the above sealing structure which utilizes the ant groove.

Patent document 1 proposes a sealing material for an ant groove wherein the sealing material is approximately in the shape of a teardrop such that a larger arched portion and a smaller arched portion are connected together through a straight edge. The fitting is facilitated by pressing first the smaller arched portion of the sealing material into the ant groove. In a fitted state, it is assumed that: one straight edge contacts with a bottom face of the ant groove, and the smaller arched portion fits into an inner corner at one side of the ant groove, and another straight edge contacts with an inner sloping face of the ant groove, whereby the sealing material is disposed in a stable state, so that there occurs little twisting.

Patent document 2 relating to a patent application previously made by the applicant of the present patent application discloses a sealing material for an ant groove wherein the sealing material comprises: circular-arc-shaped projecting portions which project in three directions; and concave inlet portions, each of which is located between the projecting portions. When fitted to the ant groove, this sealing material for an ant groove can be passed comparatively easily through a narrow opening of the ant groove by pressing the opposite circular-arc-shaped projecting portion side of the sealing material into the ant groove, with one concave inlet portion of the sealing material as the base point in a state where this concave inlet portion is disposed on an opening edge of the ant groove. In a state where the sealing material is fitted to the ant groove, a pair of circular-arc-shaped projecting portions disposed in a bilaterally symmetrical shape contact with the bottom face of the ant groove and, in the center, the remaining one circular-arc-shaped projecting portion contacts with a member facing the ant groove, whereby the good elastic deformation or sealing function can be performed.

[Patent Document 1]
JP-A-510286/1997 (Kohyo)
[Patent Document 2]
JP-A-130481/2002 (Kokai)

The aforementioned prior arts also have problems such that: the fitting to the ant groove is difficult to carry out, or the falling off from the ant groove tends to occur.

In the art of the patent document 1, after the teardrop-shaped sealing material for an ant groove has been inserted into the ant groove with the smaller arched portion of the sealing material down, the smaller arched portion must be pressed into the inner corner at one side of the ant groove in a way that the entirety of the sealing material is twisted. The motion of properly twisting the entirety of the sealing material for the ant groove in the narrow ant groove is difficult, and the fitting has directionality. Therefore, misfitting tends to be caused. From above the ant groove, it cannot be checked whether the smaller arched portion has surely be disposed into the inner corner at one side or not. Thus, there is a worry that the use is made with the fitting left insufficient. In addition, the occupation ratio of the sealing material to the ant groove is so small that, in the case where compressed repeatedly, the sealing material repeats its contact with the inner wall surface of the ant groove and therefore tends to generate particles due to friction.

As to the art of the patent document 2, the fitting to the ant groove is easier than that of the teardrop-shaped sealing material of the patent document 1. However, the motion of gyratorily pressing the opposite circular-arc-shaped projecting portion side into the ant groove, with the aforementioned concave inlet portion as the base point, needs great force. Its reason can be considered to be that, unless the entirety of the circular-arc-shaped projecting portion is elastically deformed, the sealing material cannot be passed through the opening of the ant groove. When an attempt is made to release the sealing made with the sealing material for an ant groove, such as when a motion of opening a gate valve is made, there occurs a phenomenon such that the sealing material for an ant groove unfavorably slips out of the ant groove in the form of having attached to the opposite member. This fixation phenomenon is a phenomenon which greatly occurs between a sealing material (e.g. rubber) and a metal member when the sealing material is applied to such as a gate valve of a semiconductor production apparatus, to the sealed place of which a fixation-preventing means such as greasing or coating cannot be applied. The concave inlet portions, which are disposed in positions bilaterally symmetrical as to the concave inlet portion that is utilized as the base point during the fitting, do not take part in the fitting function. Therefore, there is a possibility that the elastic repulsive force or sealing function of the sealing material for an ant groove may be spoiled correspondingly to the presence of the concave inlet portions in three places.

DISCLOSURE OF THE INVENTION

Object of the Invention

An object of the present invention is to provide a sealing material for an ant groove, wherein the sealing material is easy to fit to the ant groove, and can exercise the good sealing function, and little involves the phenomenon such that the sealing material unfavorably slips out of the ant groove in the form of remaining fixing to the opposite member when the sealed place is opened.

SUMMARY OF THE INVENTION

A sealing material according to the present invention for an ant groove is a sealing material for an ant groove, which is fitted to the ant groove made in a surface of either one of members in a joint place between these members and contacts with a surface of the other member, thereby sealing both the members, with the sealing material comprising: an elastically deformable material; and a sectional shape having: a straight bottom edge which is disposed on a bottom face of said ant groove; an arched convex edge which contacts with the surface of said other member facing said ant groove; a first projecting edge which connects with one end of said bottom edge and projects outside; a concave inlet portion which is located between said first projecting edge and said arched convex edge; a second projecting edge which connects with the other end of said straight bottom edge and is composed of straight lines that project outside; a straight sloping edge of which one end connects with the opposite end of said arched convex edge as to said first projecting edge and of which the other end connects with said second projecting edge; and at least one corner portion which is constituted in the range of from said straight bottom edge via said second projecting edge to said sloping edge.

EXPLANATION OF THE SYMBOLS

10: Member with ant groove formed therein
12: Ant groove
20: Opposite member
30: Sealing material for ant groove
31: Arched convex edge
32: Vertical edge
33: First projecting edge
34: Straight bottom edge
35, 36: Second projecting edge (straight edges)
37a to 37c: Corner portions
38: Sloping edge
39: Concave inlet portion

DETAILED DESCRIPTION OF THE INVENTION

Hereinafter, detailed descriptions are given about the sealing material according to the present invention for an ant groove. However, the scope of the present invention is not bound to these descriptions. And other than the following illustrations can also be carried out in the form of appropriate modifications of the following illustrations within the scope not departing from the spirit of the present invention.

[Joint Place]:

The sealing material is used in order that a joint place, where a pair of members are joined together face to face in various machinery and apparatus, can be sealed with high airtightness maintained. A structure portion to which such a sealing function is demanded would not especially be limited as to such as structure or shape of the members constituting the joint place.

Examples of the joint place to which the high airtightness is demanded include: a joint place between a chamber main body and an opening and shutting lid in a treatment chamber which is used in processes for production of semiconductors and liquid crystals; and a portion to which a gate valve that is free to open and close and is equipped to the above treatment chamber is furnished; and besides, a place where an opening and shutting lid or an attached instrument is furnished to such as vacuum apparatus; and a joint place of a piping instrument. Particularly, the sealing material is suitable for a place where the sealing material tends to fix to a metal member. Specifically, the sealing material is suitable for: uses to which the fixation-preventing means by greasing or coating cannot be applied; and a place where the fixation tends to make progress due to such as heat or contacting with gas.

In any case, in the joint place, a pair of members face each other, and the ant groove is made in a surface of one of the members, and the sealing material is fitted to this ant groove. The surface of the other member may be a mere flat face or, as the case may be, a shallow groove or difference in level is made in a place corresponding to the ant groove.

[Ant Groove]:

The basic sectional structure of the ant groove is approximately in the shape of a trapezoid of which the width on the inner side is larger than that on the opening side.

The bottom face of the ant groove can be a flat face parallel to the opening. Both side faces of the ant groove can be sloping-faces which slope inward from the bottom side toward the opening side. Both side faces may differ in sloping angle. A side face may be a curved face. A corner portion where a side face and the bottom face cross each other, or an inner edge of the opening, can be provided with a circular-arc-shaped R. (roundness) or rounded off.

The ant groove is disposed in a ring shape so as to enclose a region which must be sealed in the aforementioned joint place. For example, the ant groove is disposed in a ring shape so as to enclose an outer periphery of such as a vacuum space or a passageway of a fluid. As to the disposition shape of the ant groove, besides the circular shape, other shapes such as a regular oval shape, a long oval shape, a rectangular shape, and a polygonal shape can be set appropriately for the shape of the sealed place.

In the joint place, either of a pair of members may be provided with the ant groove. For example, the ant groove can be made in a bottom face of a lid which opens and shuts upward and downward.

[Sealing Material for Ant Groove]:

Techniques common to conventional O-rings and other sealing materials for an ant groove can be adopted for the constituting material and basic structure of the sealing material for an ant groove.

Natural or synthetic rubber materials and elastic resin materials are usable as the constituting material of the sealing material if they are elastic materials capable of elastic deformation which is demanded of the sealing function. Specific examples thereof include fluororubbers, silicone rubbers, and EPDM type rubbers. More specifically, it is possible to select materials appropriate for conditions of environments under which the sealing is carried out (conditions such as kinds, temperature, and pressure of fluids). For example, under corrosive environments (such as under various plasma conditions) in the field of the semiconductor production technique, the fluororubbers are favorable. In the case where the sealing material is used in an opening and shutting lid place of a drying chamber, there are preferred the EPDM type rubbers, because they are excellent in the chemical resistance and the clean property, and further, take low costs.

The basic structure of the sealing material is a ring-shaped structure, that is, a ring, having the specific sectional shape. The ring diameter and ring disposition shape of the sealing material is set so as to conform to the ring diameter and disposition shape of the ant groove to which the sealing material is fitted.

The sectional shape of the sealing material has a straight bottom edge, an arched convex edge, a first projecting edge, a concave inlet portion, a second projecting edge, a sloping edge, and a corner portion. The approximate shape of the entirety is a shape such that a heart shape is put in an inclined state on a flat face (which may hereinafter be referred to as "inclined heart shape").

<Straight Bottom Edge>:

When the sealing material is fitted to the ant groove, the straight bottom edge is disposed on the bottom face of the ant groove. Even in a state where the straight bottom edge is not in contact with the opposite member and where the press-contacting force is therefore not applied to the sealing material, the straight bottom edge face-contacts with the bottom face of the ant groove.

If the length of the straight bottom edge is enough, the force to fix the sealing material by the ant groove is larger than the fixation force between the sealing material and the opposite member during the motion of releasing the sealing, so that the sealing material can be prevented well from slipping out of the ant groove. Though depending on the demanded sealing function and on the overall sizes of the ant groove and sealing material, the length L0 of the straight bottom edge can be set in the range of L0/Y=0.35-0.6 in relation with the overall width Y of the sealing material.

<Arched Convex Edge>:

The arched convex edge contacts with a surface of the other member opposite to the ant groove, that is, the opposite member. The arched convex edge is pressed against the opposite member to thus become elastically deformed, thereby performing the appropriate sealing function.

The shape represented by the term "arched" includes smoothly curved arc shapes, such as oval arc shapes, besides circular arc shapes. Such as the elastic deformability, the area of contact with the opposite member, and the distribution of contact face pressures vary with the curvature radius of the place contacting with the opposite member. There can be adopted the same range as of the curvature radius of the place, contacting with the opposite member, of conventional sealing materials for ant grooves. When the curvature radius of the arched convex edge in the place contacting with the opposite member is represented by R1 and when the overall height of the sealing material is represented by H, these can be set so as to satisfy R1/H=0.25-0.3, though depending on the overall size of the sealing material and on the demanded performances.

<First Projecting Edge>:

The first projecting edge connects with one end of the straight bottom edge and projects outside this end portion of the straight bottom edge. In a state fitted to the ant groove, the first projecting edge is seated in a space which is inside the ant groove, outside the opening of the ant groove, and under a sloping face of the ant groove.

The shape of the first projecting edge is free of especial limitation if its entirety is a convex shape. Specific examples thereof include: curved line shapes such as circular arc shapes; crooked line shapes consisting of more than one straight line; and combinations of curved line shapes and straight line shapes. In the case where the first projecting edge is arched, its curvature radius R2 can be set in the range of R1/R2=0.95-1.05 in relation with the curvature radius R1 of the arched convex edge. Usually, R1=R2 will do.

The first projecting edge is effective in securing the straight bottom edge in a sufficient length. Even if the sealing material falls into danger of being drawn out of the ant groove during the motion of releasing the sealing, the first projecting edge contacts with a sloping face of the ant groove to thus exercise the resistance force and therefore plays a part also in preventing the slipping-out of the sealing material.

<Concave Inlet Portion>:

The concave inlet portion is located between the first projecting edge and the aforementioned arched convex edge. When the sealing material is fitted to the ant groove, the concave inlet portion is disposed on an opening edge of the ant groove to thus serves as the base point when the sealing material is gyratorily pressed into the ant groove.

The shape of the concave inlet portion is free of especial limitation if such a function can be performed. Shapes which conform to the opening edge of the ant groove are adoptable. For example, in the case where the opening edge of the ant groove has an R (roundness), concave circular arc shapes having a curvature radius a little larger than this R. (roundness) are adoptable.

<Second Projecting Edge>:

The second projecting edge connects with the other end of the straight bottom edge and is composed of straight lines that project outside. It is also the structure for constituting the below-mentioned corner portion.

The second projecting edge may be either one straight edge extending obliquely outward from the above end portion of the straight bottom edge or a combination of at least two straight edges which connect with each other in a shape crooked in order from the above end portion of the straight bottom edge. A pair of straight edges, in other words, two straight edges, can be combined together in a convexly crooked shape, namely, an elbow shape. It is also possible to combine straight edges different in length or combine straight edges at different crooked angles. Furthermore, a curve portion may partly be included within the range not spoiling the objective functions.

When the sealing material is fitted to the groove, the second projecting edge is disposed inside the ant groove, outside the opening of the ant groove, and below a sloping face of the ant groove. The length of the straight bottom edge varies with the projection amount of the second projecting edge as well as with that of the aforementioned first projecting edge to thus enhance the function of preventing the slipping-out from the ant groove.

The corner portions, which are constituted in positions where the straight edges included in the second projecting edge cross each other and in positions where the second projecting edge crosses the straight bottom edge and the sloping edge, perform the function of enhancing the fittability to the ant groove or the fixation force to the bottom face of the ant groove.

In the crossing place between the second projecting edge and the straight bottom edge, the sloping angle of the second projecting edge to the straight bottom edge can be set in the range of $\theta1=30\text{-}70°$.

<Sloping Edge>:

One end of the sloping edge connects with the opposite end portion of the arched convex edge as to the first projecting edge, and the other end of the sloping edge connects with the second projecting edge, and the sloping edge is straight.

The sloping edge is desired to connect smoothly with the arched convex edge. As to the second projecting edge, the sloping edge is desired to cross it to thus constitute a corner portion together therewith. When the sealing material is disposed on a flat face, the sloping edge can be made to possess a sloping angle in the range of $\theta2=30\text{-}45°$ to a vertical direction.

The possession of the sloping edge makes it possible to sufficiently secure the thickness of the sealing material above the second projecting edge. As a result, when the arched convex edge is pressed against the opposite member, the repulsive force is sufficiently generated to thus make it possible to enhance the contact face pressure. During the motion of releasing the sealing, the portions ranging from the second projecting edge to the sloping edge contact with a sloping face of the ant groove outside the opening of the ant groove, so that the sloping edge of the sealing material face-contacts with the sloping face of the ant groove across the wide range. Thereby the slipping-out of the sealing material can strongly be resisted.

<Corner Portion>:

The corner portion is constituted in the range of from the straight bottom edge via the second projecting edge to the sloping edge. The corner portion will do if it exists in at least one place. As the case may be, it is constituted in more than one place.

The number and positions of the corner portions being disposed vary with the shape of the second projecting edge. If the lower end of the second projecting edge is a straight line, then a corner portion is constituted between the straight bottom edge and the straight line portion of the second projecting edge. In the case where the second projecting edge is the combination of more than one straight line portion in a crooked shape, a corner portion is constituted in each crooked place. If the upper end of the second projecting edge is a straight line, then a corner portion is constituted between the upper end of the second projecting edge and the sloping edge.

The corner portion may be a corner portion which refers to a crossing in the geometric meaning where straight lines cross each other. What has been formed by rounding off a crossing place between straight lines so as to have a small R (roundness) is also included in the conception of the corner portion. In cases of industrially produced sealing materials, it often follows that their corner portions substantially have the aforementioned R (roundness). The size of the R (roundness) can be set in the range of 0.1 to 0.5 mm.

The maximum value X of distances of from the corner portion to the concave inlet portion can be set so as to have a relationship of $X/B=1.00\text{-}1.10$ with an opening width B of the ant groove. Favorably, $X/B=1.01\text{-}1.06$.

If the number of the corner portions is 1, then the distance over which this one corner portion and the concave inlet portion are linked together is the distance X. Hereupon, the distance, over which the corner portion and the concave inlet portion are linked together, refers to the shortest distance over which their respective shapes are linked together by a straight line in the case where the corner portion has an R (roundness) or where the concave inlet portion is concavely arched. In the case where more than one corner portion are present, the longest distance in comparison between distances over which those corner portions are linked with the concave inlet portion is taken as the distance X.

When the sealing material is fitted to the groove, the sealing material needs to be elastically deformed in a sealing-material-shrinking direction by the degree of the difference between the distance X and the opening width B. Accordingly, the smaller the ratio X/B is, the smaller deformation amount the fitting is satisfied with and therefore the easier the fitting becomes. However, in the case where the ratio X/B is too small, only a small volume is seated inside the ant groove and outside the opening of the ant groove, so that the length of the straight bottom edge cannot sufficiently be secured, or that there is a tendency for the sealing material to slip out of the ant groove during the motion of releasing the sealing.

<Vertical Edge>:

The arched convex edge and the concave inlet portion may connect directly with each other. However, the sealing material can further comprise a vertical edge connecting the arched convex edge and the concave inlet portion together.

The vertical edge is an edge which extends in a vertical direction that crosses a flat face or the straight bottom edge at right angles in a state where the straight bottom edge of the sealing material is mounted on the above flat face.

The possession of the vertical edge makes it possible to increase the distance of from the top of the arched convex edge to the straight bottom edge, that is, the overall height of the sealing material, in a state where the first projecting edge and the concave inlet portion are seated inside the ant groove. In the sealed state, it is possible to increase the compression deformation amount in a direction of the height of the sealing material to thereby enhance the contact face pressure. In addition, the vertical edge plays a part also in making a sufficient clearance between an inner edge of the opening of the ant groove and the sealing material. This prevents a side face of the arched convex edge from being damaged or deteriorated in durability due to its contact with an opening edge of the ant groove. Even if, when the motion of opening and shutting the sealed portion, the sealing material becomes deformed in a state where the ant groove side member and the opposite member slip a little on each other in horizontal directions, then the arched convex edge can be prevented from colliding with an opening edge of the ant groove.

<Peripheral Length>:

As to the sealing material which is fitted to the aforementioned ant groove of a ring shape in a ring shape corresponding to the aforementioned ant groove of the ring shape, it is desirable that the first projecting edge and the concave inlet portion are located at the outer peripheral side of the ring shape, and that the second projecting edge, the straight sloping edge, and the corner portion are located at the inner peripheral side of the ring shape.

If the peripheral length of the sealing material having such a disposition structure is adjusted, then the performances of the sealing material can more effectively be exercised.

In cases of uses under vacuum, it is desirable that the peripheral length of the sealing material is made shorter than that of the ant groove. If inner peripheral portions of the sealing material, namely, the sloping edge and the corner portion (which is constituted in a portion of the second projecting edge), are brought into contact with the inner peripheral side face of the ant groove in a state where the sealing material is fitted to the ant groove, then the ant groove's inner spaces which open into the chamber's inner spaces decrease, so that the sealing material becomes suitable as a sealing material for vacuum. As to the sealing material according to the present invention, while on the one hand the structure of the second projecting edge facilitates the fitting, it also has a tendency toward falling off. However, if the inner diameter of the sealing material is extended in the fitted state, then the retention force of the sealing material is enhanced. In addition, during the fitting motion, the sealing material is fitted in the predetermined position and attitude in a state shrunken toward the inner diameter side immediately after passing through the opening of the ant groove. Therefore, misfitting occurs little.

Furthermore, in the case where the peripheral length of the sealing material is shorter than that of the ant groove, the sealing material comes into an extended state to cause its elastic deformation or inner stress, so that the fixation force of the sealing material to the ant groove increases. The concave inlet portion contacts with an opening edge of the ant groove to thus cause engagement of the sealing material, so that the stress is caused concentratedly on the concave inlet portion. Thus, problems of deterioration in strength and durability can also be prevented.

It is desirable that the peripheral length of the sealing material is extended by 1-10% in a state where the sealing material is fitted to the ant groove of the ring shape when compared with a free state where no external force is applied to the sealing material. Favorably, the peripheral length is extended by 4-6%.

DETAILED DESCRIPTION OF THE PREFERRED EMBODIMENTS

Hereinafter, the present invention is more specifically illustrated by the following examples of some preferred embodiments (modes for carrying out the present invention) while referring to the drawings. However, the present invention is not limited to them in any way.

Figure 1:
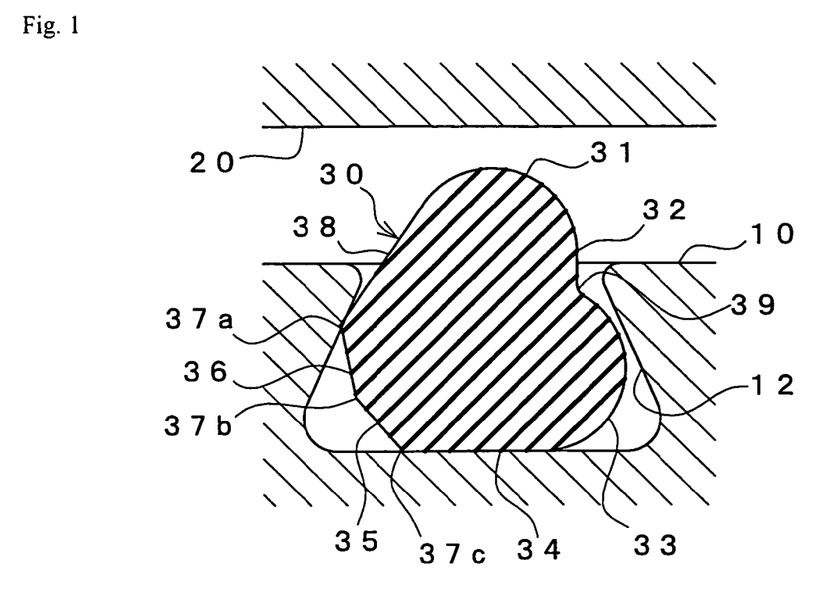
FIG. 1 is a sectional view of a sealing material for an ant groove in a fitted state, illustrating a mode for carrying out the present invention.
Figure 2:
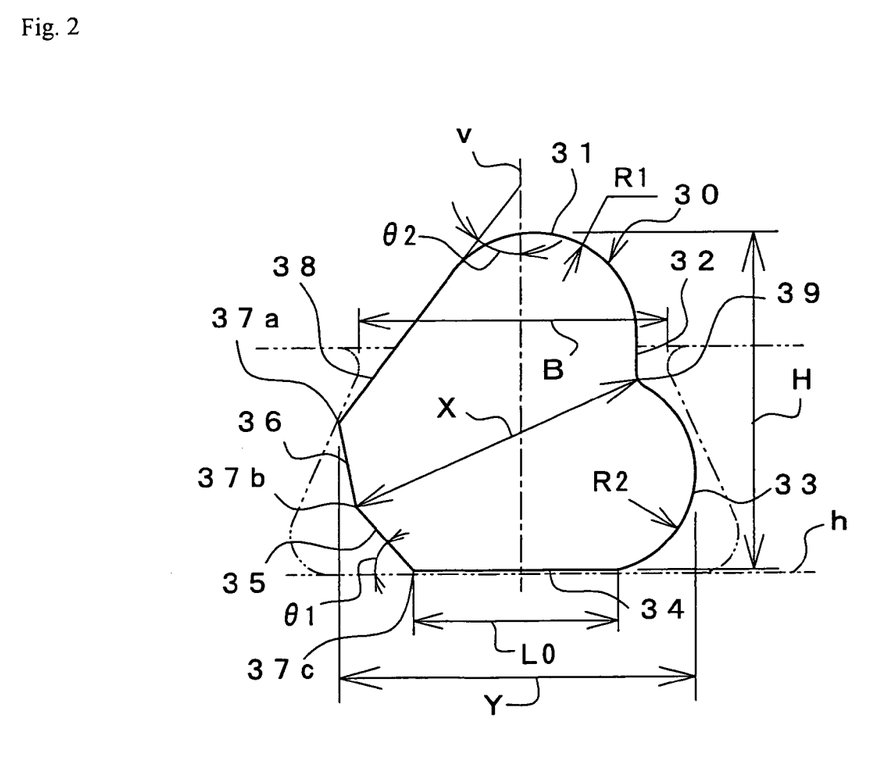
FIG. 2 is an outline view illustrating the sectional shape and size of the sealing material for an ant groove.

As is shown in FIGS. 1 and 2, the sealing material 30 for an ant groove approximately in an inclined heart shape is made of an elastically deformable rubber material in its entirety and is a ring shape continuing in the sectional shape shown in the drawing figures. Fluororubbers, silicone rubbers, and EPDM type rubbers of about 60 to about 70 HA in hardness are usable as the rubber material.

The sealing material 30 is fitted to a place where a pair of members 10 and 20 are to be sealed. In a surface of a counterpart member 20, an ant groove 12 of a ring shape is formed. The ant groove 12 is in the shape of a trapezoid which widens in the shape of a taper ranging from the upper end opening to the lower end. The ant groove 12 has right and left sloping faces and a flat bottom face. The width of the opening is represented by B. The opening edges are provided with a small R (roundness). The inner corner portions where the right and left sloping faces and the bottom face cross each other are also provided with a roundness.

Figure 9:
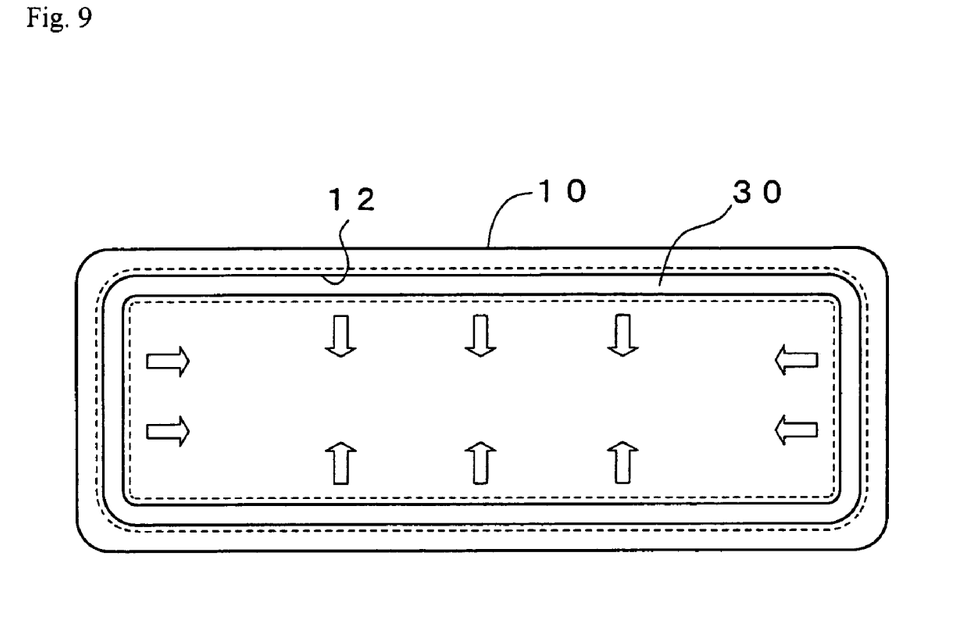
FIG. 9 is a plan view during the fitting to a sealing plate.
Figure 10:
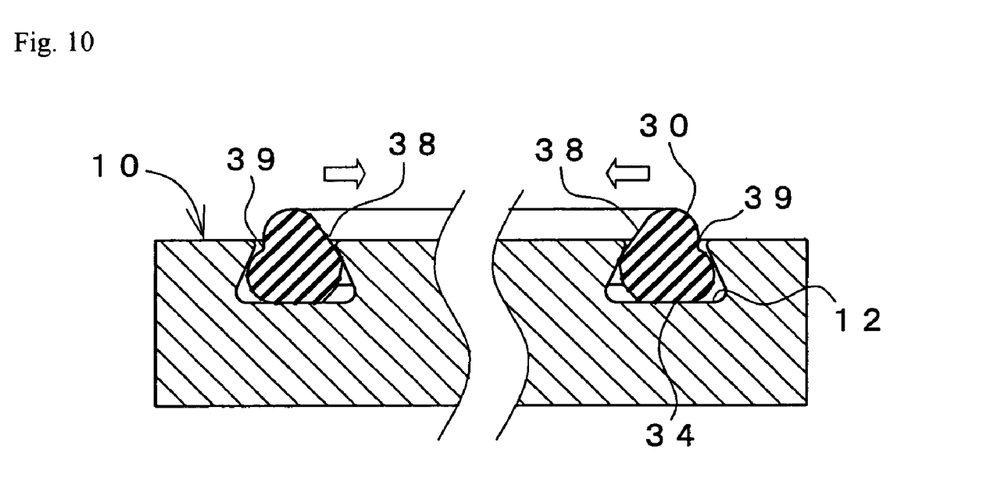
FIG. 10 is a sectional view of the same as the above.

[Overall Fitting Mode]:

FIGS. 9 and 10 illustrate a case where the sealing material 30 has been incorporated into a sealing plate 10 (which is a sealing member for a gate valve of semiconductor production apparatus) as an overall fitting mode of the sealing material 30.

The sealing plate 10 is a rectangular plate shape. The ant groove 12 is disposed in a rectangular ring shape along the outer periphery of one face. The sealing material 30 for an ant groove is fitted to this ant groove 12. The opening of the gate valve is sealed by pressing the sealing plate 10 against a valve seat face provided to the outer periphery of the opening of the gate valve which is the opposite member to be sealed. By the motion of opening and closing the gate valve, the sealing plate 10 repeats a state of being pressed against the valve seat face to thus seal the joint place and a state of separating from the valve seat face along with the sealing material 30 fitted to the ant groove 12.

The peripheral length of the sealing material 30 is formed so as to be a little shorter than that of the ant groove 12. In the state fitted to the ant groove 12, the sealing material 30 is in a state where its peripheral length is extended and in a state pressed on the inner peripheral side of the ant groove 12.

[Structure of Sealing Material for Ant Groove]:

The sectional outline shape of the sealing material 30 as illustrated in FIG. 2 is hereinafter explained on the basis of a horizontal line h corresponding to a bottom face of the ant groove 12 and a vertical line v crossing the horizontal line h at right angles.

The straight bottom edge 34 extends along the horizontal line h and, when fitted to the ant groove 12, contacts with the bottom face of the ant groove 12. The length of the straight bottom edge 34 is L0.

On the right and left sides of the straight bottom edge 34, there are a first projecting edge 33 and a second projecting edge 35, 36.

The first projecting edge 33 is a circular arc shape of R2 in curvature radius and projects outward from an end portion of the straight bottom edge 34. The upper portion of the first projecting edge 33 connects smoothly with a concave inlet portion 39 of a small concave circular arc shape. The upper portion of the concave inlet portion 39 connects smoothly with a vertical edge 32 consisting of a straight line parallel to the vertical line v. The upper portion of the vertical edge 32 connects smoothly with an arched convex edge 31 of a circular arc shape of R1 in curvature radius.

The second projecting edge 35, 36 is composed of two straight edges 35, 36. The straight edge 35 extends obliquely outward from an end portion of the straight bottom edge 34. In the crossing place between the straight bottom edge 34 and the straight edge 35, there exists a corner portion 37c. The sloping angle of the straight edge 35 to the straight bottom edge 34 is θ1. In the case of this mode for carrying out the present invention, the sloping angle can be set in the range of θ1=about 30 to about 40°. The next straight edge 36 having a larger sloping angle than the straight edge 35 connects with the upper end of the straight edge 35. Also in the crossing place between the straight edges 35 and 36, there exists a corner portion 37b. The upper end of the straight edge 36 connects with a sloping edge 38 which slopes inward. Also in the crossing place between the straight edge 36 and the sloping edge 38, there exists a corner portion 37a. The upper end of the sloping edge 38 smoothly connects with the arched convex edge 31. The sloping angle of the sloping edge 38 to the vertical line v is θ2.

The overall width Y of the sealing material 30 is the distance of from the corner portion 37a (between the straight edge 36 and the sloping edge 38) to the outer peripheral end of the first projecting edge 33. The overall height H of the sealing material 30 is the distance of from the straight bottom edge 34 to the upper end of the arched convex edge 31. The maximum value X of the distances of from the corner portions 37a, 37b, and 37c to the concave inlet portion 39 is the distance X of from the corner portion 37b (between the straight edges 35 and 36) to the concave inlet portion 39.

[Mode of Fitting to Ant Groove]:

The size of each portion in the above sectional outline shape is set so that such a fitting mode as shown in FIG. 1 can be realized to the ant groove 12 which is to receive the fitting. Specifically, the straight bottom edge 34 contacts with the bottom face of the ant groove 12. The corner portion 37a between the sloping edge 38 and the straight edge 36 contacts with the inner peripheral side sloping face of the ant groove 12. The entirety of the second projecting edge 35 and 36 projects outside the opening of the ant groove 12 and is seated under the sloping face of the ant groove 12. The first projecting edge 33 also projects outside the opening of the ant groove 12 and is seated under the sloping face of the ant groove 12. The concave inlet portion 39 is disposed a little below and a little inside the opening of the ant groove 12 and has a little clearance between the concave inlet portion 39 and an opening edge. The vertical edge 32 extends from a little inside an opening edge of the ant groove 12 to above this opening edge. The arched convex edge 31 projects out of the surface of the member 10. The upper end of the arched convex edge 31 faces the surface of the opposite member 20. The amount of the projection of the arched convex edge 31 above the ant groove 12 corresponds to the tightening cost during the sealing.

As is aforementioned, when fitted to the ant groove 12, the sealing material 30 comes into a state where its peripheral length is extended, so that the corner portion 37a of the sealing material 30 at its inner peripheral side comes into a state pressed against the inner peripheral side sloping face of the ant groove 12, and that the concave inlet portion 39 and the vertical edge 32 come into a state apart from the outer peripheral side sloping face and opening edge of the ant groove 12.

Figure 3:
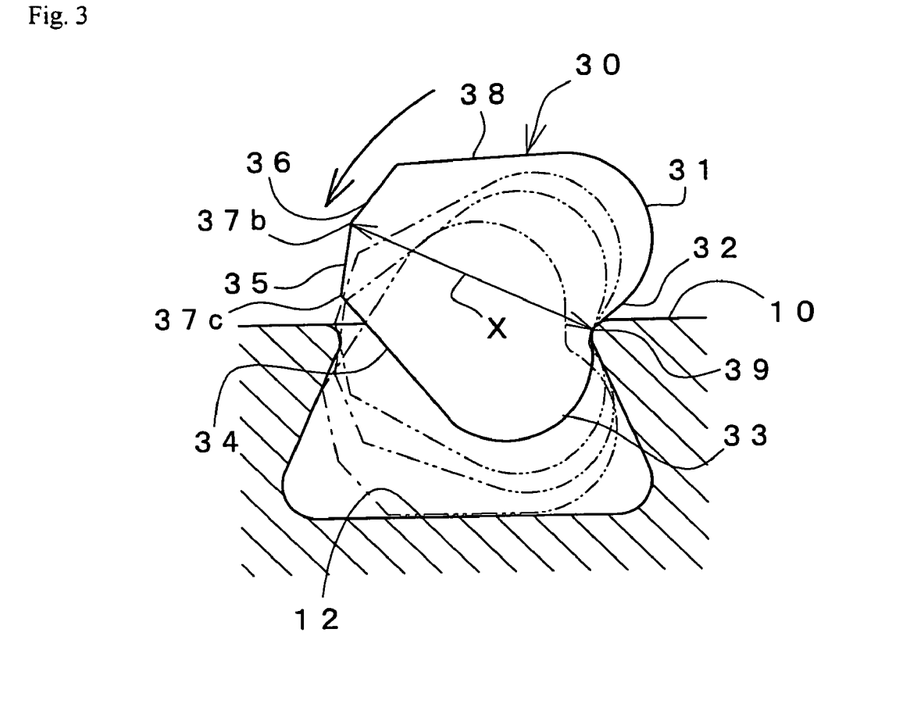
FIG. 3 is a motion-explaining view illustrating the operation of fitting the sealing material for an ant groove.

[Fitting of Sealing Material for Ant Groove]:

FIG. 3 illustrates a fitting motion of the sealing material 30 stepwise with double-dot chain lines.

First of all, the concave inlet portion 39 of the sealing material 30 is positioned on an opening edge of the ant groove 12. If the vertical edge 32 of the sealing material 30 is slipped in a state touched to the opening edge of the ant groove 12, then the concave inlet portion 39 is surely positioned on the opening edge of the ant groove 12.

If the second projecting edge 35, 36 side is made to gyrate downward around the concave inlet portion 39 as the base point, then a part of the second projecting edge 35 and 36 hits on an opening edge of the ant groove 12. Specifically, the straight edge 35 near the corner portion 37b hits on this opening edge of the ant groove 12.

The sealing material 30 is made to further gyrate downward to thus press it into the ant groove 12. While the sealing material 30 gets elastically deformed in the periphery of the corner portion 37b, the corner portion 37b passes the above opening edge of the ant groove 12.

If the sealing material 30 passes the above opening edge of the ant groove 12, then thereafter the sealing material 30 migrates downward as it is. And then, if the straight bottom edge 34 of the sealing material 30 contacts with the bottom face of the ant groove 12, then the sealing material 30 becomes fitted to the ant groove 12.

In the above fitting motion, an adequate fitted state is surely obtained by only pressing the sealing material 30 into the ant groove 12 in a way for the entire sealing material 30 to gyrate after having positioned the concave inlet portion 39 by disposing it on an opening edge of the ant groove 12. The concave inlet portion 39 is easy to confirm also visually, and its concavity can be confirmed even by the feel obtained by touching its surface. Therefore, there is almost no possibility of making a mistake in the motion of disposing the concave inlet portion 39 on an opening edge of the ant groove 12. If the concave inlet portion 39 is utilized as the base point, then the motion of pressing the sealing material 30 into the ant groove 12 can be carried out easily and surely. The elastic deformation of the sealing material 30 during its fitting to the ant groove 12 will do if it occurs to only a slight portion in the periphery of the corner potion 37b. Therefore, the pressing of the sealing material 30 into the ant groove 12 can be achieved by only applying a comparatively weak force. If the corner portion 37b passes an opening edge of the ant groove 12, then the straight bottom edge of the sealing material 30 comes into contact with the bottom face of the ant groove 12 naturally as it is without twisting the sealing material 30 or much changing its attitude inside the ant groove 12, so that the sealing material 30 is fitted in the predetermined position and attitude.

In such a way, the fitting motion is easy. Therefore, there is a merit such that it is not necessary to specify the size tolerance so much strictly during the production of the sealing material 30. Even if the size of the sealing material 30 is a little too large, there is no possibility that the motion of pressing it into the ant groove 12 is difficult. Even if the size of the sealing material 30 is a little too small, then, in a state fitted to the ant groove 12, the first projecting edge 33 and the second projecting edge 35, 36 project outside the opening of the ant groove 12 to thus surely prevent the sealing material 30 from falling off from the ant groove 12. In a state fitted inside the ant groove 12, the straight bottom edge 34 contacts with the bottom face of the ant groove 12 across a wide area to thereby enable good prevention of such as tumbling, attitudinal variation, and positional deflection.

<Detection of Misfitting>:

As to the sealing material 30 according to the present invention, its adequate fitted state can be obtained easily and surely without needing any special technique. However, as the case may be, misfitting is caused by such as making a mistake in the operational procedure.

Figure 4:
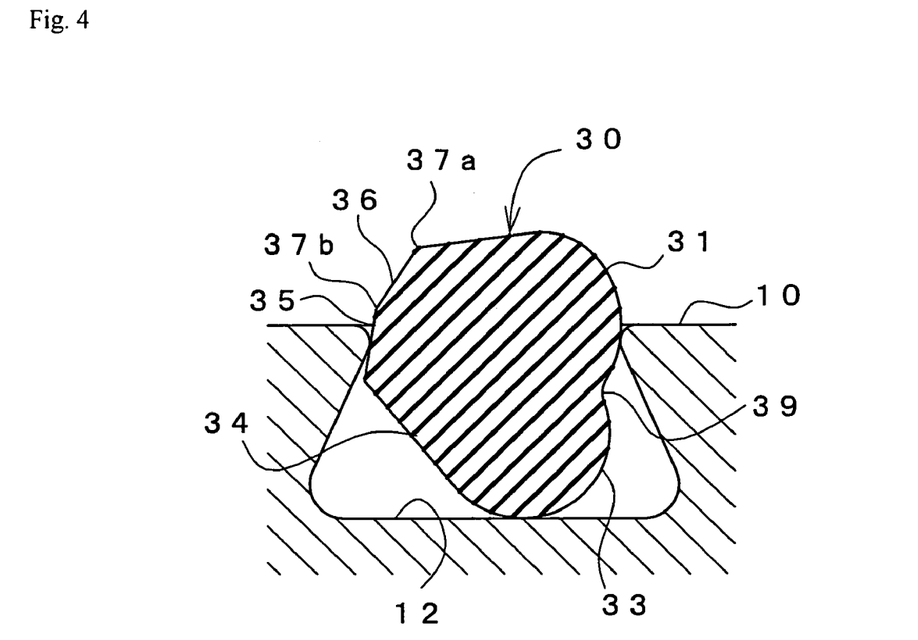
FIG. 4 is a sectional view of a misfitted state.

For example, as is illustrated in FIG. 4, as the case may be, for the cause such that the concave inlet portion 39 of the sealing material 30 is not brought into precise contact with an opening edge of the ant groove 12, the concave inlet portion 39 unfavorably falls into the ant groove 12 before the entirety of the sealing material 30 enters sufficiently the inside of the ant groove 12. The first projecting edge 33 hits on the bottom face of the ant groove 12 earlier than the straight bottom edge 34. In this state, however strongly the sealing material 30 may be pressed into the ant groove 12, it is impossible to carry out the pressing any more. There is a worry that, in this stage when it has become impossible to press the sealing material 30 into the ant groove 12, the fitting may be wrongly recognized to have properly been completed.

However, in such a misfitted state, the corner portion 37b in the middle of the second projecting edge 35 and 36 and the corner portion 37a between the sloping edge 38 and the straight edge 36 of the second projecting edge result in remaining exposed above the ant groove 12. The corner portions 37a and 37b can be confirmed visually as ridgelines distinctly different from their peripheral curved faces and flat faces. Even if the sealing material 30 is such as black and is therefore in a state where it is difficult to distinguish differences between faces, the ridgelines where faces cross each other can be confirmed distinctly by the eye. In addition, if a finger is touched to the sealing material 30 along its surface outside the ant groove 12, then the ridgeline portions give a feel different distinctly from their peripheries.

From such differences in external appearance or feel, the misfitting can easily be discovered. As a result, there is reduced a problem such that such as unsatisfactory sealing or damage to the sealing material 30 is caused by the use without noticing the misfitting.

Figure 5:
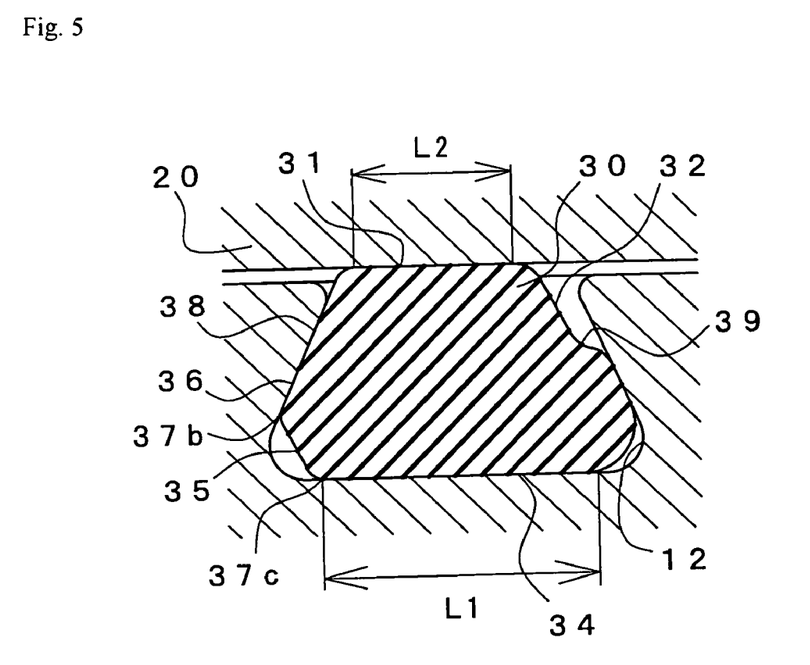
FIG. 5 is a sectional view of a sealed state.

[Sealing Function of Sealing Material for Ant Groove]:

As is illustrated in FIG. 5, the opposite member 20 comes into contact with the upper portion of the sealing material 30 fitted to the ant groove 12. The opposite member 20 contacts with the top of the arched convex edge 31 of the sealing material 30 and then presses it downward. The press force transmitted downward from the arched convex edge 31 deforms elastically the entirety of the sealing material 30. The repulsive force of the elastically deformed sealing material 30 causes a high contact face pressure in the contact range L2 between the sealing material 30 and the opposite member 20, so that the contact range L2 is sealed. Because the straight bottom edge 34 of the sealing material 30 is also pressed against the bottom face of the ant groove 12, a high contact face pressure occurs also in the contact range L1 between them, so that the sealing is made.

Incidentally, inside the ant groove 12, the sealing material 30 becomes deformed so as to expand right and left sideward. As a result, the circular-arc-shaped first projecting edge 33 becomes deformed so as to contact with the range of from the bottom face to sloping face of the ant groove 12. The shape ranging from the arched convex edge 31 via the vertical edge 32 to the concave inlet portion 39 also becomes deformed so as to be compressed upward and downward and to expand sideward. As to the arched convex edge 31, its upper end face becomes flat. However, some degree of clearance is maintained between the vertical edge 32 and an opening edge of the ant groove 12.

The straight edges 35, 36 of the second projecting edge and the sloping edge 38 also become deformed along a sloping face of the ant groove 12 from its bottom face. The sloping edge 38 face-contacts with the sloping face of the ant groove 12 across the wide range from the upper straight edge 36. This contact range also contributes to the sealing function. A part of the lower straight edge 35 is disposed in the form of obliquely traversing an inner corner portion of the ant groove 12.

When the length of the contact range L2 between the sealing material 30 and the opposite member 20 on the upper end side of the sealing material 30 is compared with the length of the contact range L1 between the sealing material 30 and the bottom face of the ant groove 12 on the lower end side of the sealing material 30, then L1>L2 is satisfied. The fixation force between the ant groove 12 and the sealing material 30 is larger than the fixation force between the sealing material 30 and the opposite member 20.

Figure 6:
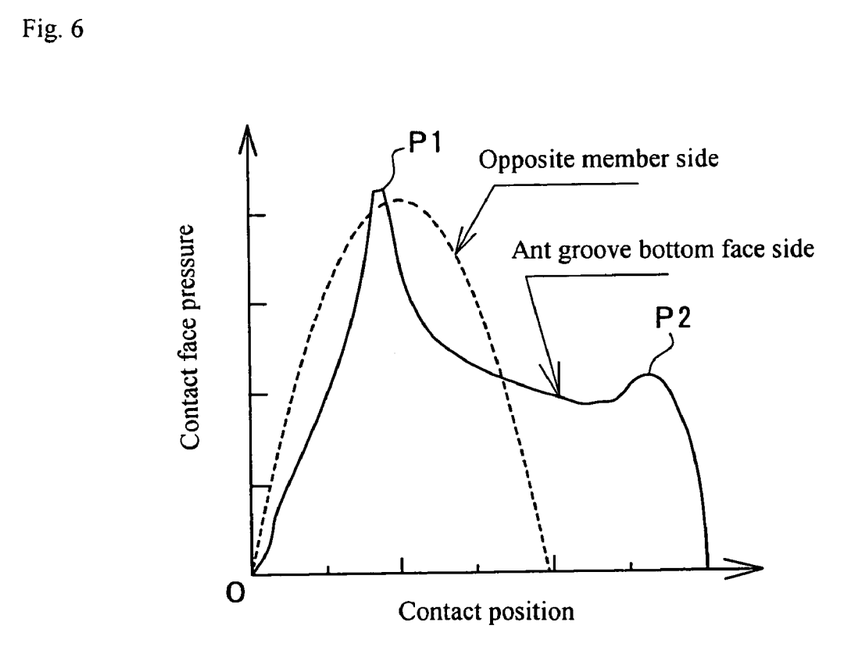
FIG. 6 is a graphic view of contact face pressure distributions in the sealed state.

<Contact Face Pressure>:

FIG. 6 shows a distribution graph of contact face pressures acting on the sealing material 30. Shown are contact face pressures in the contact range L1 between the sealing material 30 and the bottom face of the ant groove 12 on the bottom face side of the sealing material 30 and contact face pressures in the contact range L2 between the sealing material 30 and the surface of the opposite member 20 on the top face side of the sealing material 30.

First of all, an explanation is given below about the bottom face side (ant groove bottom face side) of the sealing material 30.

In FIG. 5, the origin of the graph corresponds to the left end of the contact range L1 between the sealing material 30 and the bottom face of the ant groove 12. The contact face pressure rapidly rises from this origin and then leads to a sharp-pointed peak P1. This rising line is caused by the elastic repulsive force of the portions, ranging from the second projecting edge 35, 36 to the sloping edge 38, of the sealing material 30. The peak point P1 is a position corresponding to the corner portion 37c between the straight bottom edge 34 and the second projecting edge 35. It can be inferred that, in such a position where the shape varies intermittently, the contact face pressure becomes maximized for the cause such that the stress concentrates.

Beyond the aforementioned peak P1, the contact face pressure decreases. However, after having decreased a little, the contact face pressure does not vary so much in the range corresponding to the straight bottom edge 34 of the sealing material 30.

Also in the range of from the straight edge 34 via the first projecting edge 33 to an end portion of the contact range L1, there is a peak P2 of a rise of the contact face pressure. However, the peak P2 in this portion is a peak P2 which is lower than the aforementioned peak P1 and is dull-pointed and gentle. Its cause can be inferred as follows: because the shape smoothly varies in the range of from the straight bottom edge 34 to the first projecting edge 33, the stress does not concentrate so extremely much, and the contact face pressure varies comparatively gently. The thickness of the sealing material 30 is lessened correspondingly to the presence of the concave inlet portion 39 above the first projecting edge 33, and this also can be considered to be a cause that the height of the peak P2 is lower than that of the peak P1.

In the case where there is possessed such a contact face pressure distribution, it follows that the high contact face pressure at the aforementioned sharp-pointed peak P1 enhances greatly the sealing function between the sealing material 30 and the bottom face of the ant groove 12. Also, because the sealing material 30 comes into a state strongly fixed to the bottom face of the ant groove 12, there is enhanced the function of preventing the sealing material 30 from floating up from the ant groove 12 during the motion of releasing the sealing.

Next, an explanation is given below about the top face side (opposite member side) of the sealing material 30.

In FIG. 5, the origin of the graph corresponds to the left end of the contact range L2 between the sealing material 30 and the surface of the opposite member 20. The contact face pressure draws a parabola having its peak at the tip end of the arched convex edge 31. The contact face pressure continuously decreases both sideward from this peak.

Figure 7:
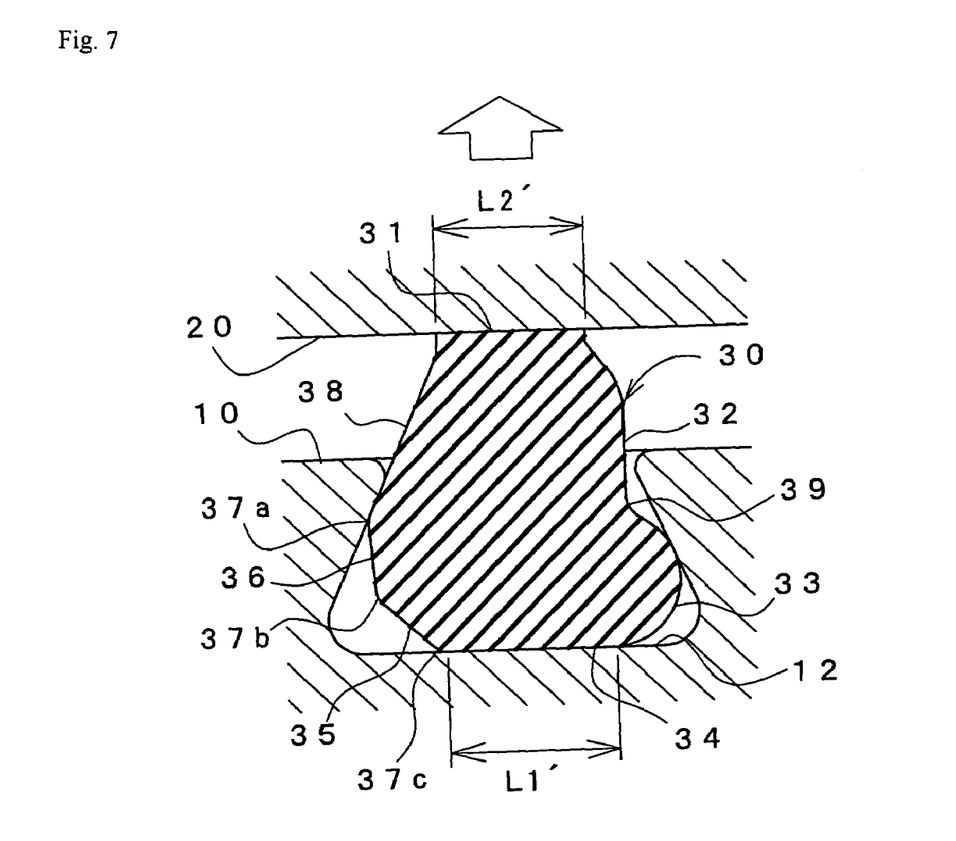
FIG. 7 is a sectional view during the motion of releasing the sealing.

[Prevention of Slipping-Out of Sealing Material for Ant Groove]:

As is illustrated in FIG. 7, such as when the gate valve is opened, the opposite member 20 is separated from the member 10 having the ant groove 12.

Between the sealing material 30 and the opposite member 20 which were pressed against each other by high contact face pressure and between the sealing material 30 and the ant groove 12 which were pressed against each other by high contact face pressure, there occur fixation ranges L2' and L1' respectively where they have been fixed to each other.

If the opposite member 20 is separated in this state, the sealing material 30 becomes deformed so as to be extended between the range L2' of the fixation to the opposite member 20 and between the range L1' of the fixation to the bottom face of the ant groove 12. Either smaller one in fixation force of the upper and lower fixation ranges L2' and L1' becomes peeled off earlier than the other.

Properly, the fixation range L2' between the opposite member 20 and the sealing material 30 is peeled off, so that the sealing material 30 is left behind remaining fitted to the ant groove 12, and that only the opposite member 20 goes away.

However, if the fixation force between the sealing material 30 and the bottom face of the ant groove 12 is weak, then there occurs a problem such that the fixation range L1' between the sealing material 30 and the bottom face of the ant groove 12 is peeled off earlier and, as a result, the sealing material 30 is unfavorably slipped out of the ant groove 12 in a state attached to the opposite member 20.

Particularly, if the motion of separating the opposite member 20 is made in a tilted state or in such a form as slid, then, as the case may be, the sealing material 30 and the bottom face of the ant groove 12 are earlier peeled off from each other even though the fixation force between the sealing material 30 and the bottom face of the ant groove 12 is strong in some degree.

As is aforementioned, in the above mode for carrying out the present invention, the fixation range L1' between the bottom face of the ant groove 12 and the sealing material 30 has, at both ends of this fixation range, the peaks P1 and P2 of the contact face pressure. Therefore, the fixation force between the sealing material 30 and the ant groove 12 is so high that they are not easily peeled off from each other. For the sealing material 30 to be peeled off from the bottom face of the ant groove 12, naturally, the peeling-off must make progress gradually from both ends of the fixation range to its center. However, because the peaks where the contact face pressure is high are present at both ends, the peeling-off does not make progress toward the center side unless a peeling-off force stronger than the fixation force at the above peak point P1 or P2 is applied.

On the other hand, in the fixation range L2 between the sealing material 30 and the opposite member 20, the contact face pressure acting between the arched convex edge 31 of the sealing material 30 and the opposite member 20 is parabolic. Therefore, also as to the fixation force, it peaks at the top of the arched convex edge 31 and becomes weaker gently both sideward. The peeling-off force acts on the weak portions at both ends of the fixation range to thus peel off the sealing material 30 and the opposite member 20 from each other and then gradually acts toward the center, so that the entirety of the fixation range becomes peeled off easily.

As a result of the above, the sealing material 30 involves an extremely great difference between the fixability to the opposite member 20 on the upper end side and the fixability to the bottom face of the ant groove 12 on the lower end side. Therefore, the sealing material 30 and the opposite member 20 easily peel off from each other, so that the sealing material 30 can maintain an appropriate fitted state seated in the ant groove 12.

Furthermore, in FIG. 7, the sloping edge 38 of the sealing material 30 comes into contact with a sloping face of the ant groove 12 across a wide range along this sloping face, and the resistance acting due to this contact also effectively performs the function of preventing the sealing material 30 from slipping out of the ant groove 12.

Figure 8:
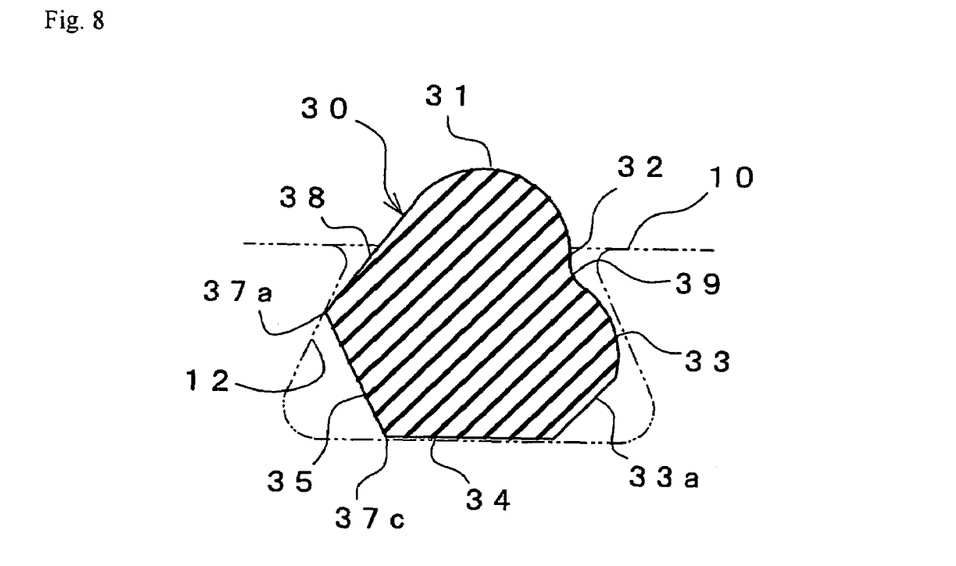
FIG. 8 is a sectional view illustrating a modified mode of the sectional shape.

[Another Mode, Different as to Sectional Shape, for Carrying Out the Present Invention]:

The sealing material 30 for an ant groove, which is a mode illustrated in FIG. 8 for carrying out the present invention, is common to the aforementioned mode for carrying out the present invention as to basic structure, but is different therefrom partly as to shape. Different points are mainly explained below.

Only one straight edge 35 is provided as the second projecting edge which connects the straight bottom edge 34 and the sloping edge 38 together. The corner portions 37$a$ and 37$c$ are constituted at both ends of the straight edge 35. The sloping angle θ1 between the straight bottom edge 34 and the straight edge 35 in this mode for carrying out the present invention is set at an angle which is a little larger than that in the mode for carrying out the present invention such as FIG. 2 in which the second projecting edge is composed of two straight edges 35 and 36. The maximum value X of distances over which the concave inlet portion 39 and the second projecting edge 35 are linked together is the distance of from the concave inlet portion 39 to the corner portion 37$a$ or 37$c$. When the sealing material 30 is fitted to the ant groove 12, the elastic deformation of the sealing material 30 becomes needed in a period when the corner portion 37$c$ or corner portion 37$a$ passes through the opening of the ant groove 12. In both periods, the deformation can be made by comparatively small force. In such a misfitting case as illustrated in FIG. 4, the corner portion 37$a$ still results in remaining exposed outside the ant groove 12, and therefore the misfitting can easily be detected.

The first projecting edge 33 is a circular arc shape in its entirety and has a straight edge 33$a$ as a portion connecting with an end portion of the straight bottom edge 34. Accordingly, it follows that, also at the boundary between the straight bottom edge 34 and the first projecting edge 33, there is a corner portion. In such a shape, the contact face pressure distribution as illustrated in FIG. 6 results in indicating sharp-pointed high peaks at both ends of the straight bottom edge 34. As a result, the sealing function between the sealing material 30 and the bottom face of the ant groove 12 is enhanced, and the fixation force therebetween also increases, and the slipping of the sealing material 30 out of the ant groove 12 due to the motion of releasing the sealing is also well prevented.

INDUSTRIAL APPLICATION

The sealing material according to the present invention for an ant groove can be fitted to the ant groove extremely easily in a proper attitude by pressing the sealing material into the ant groove in a way for the second projecting edge side to gyrate in a state where the concave inlet portion of the sectional shape of the sealing material is disposed on an opening edge of the ant groove. Particularly, at the second projecting edge side, if locally only the neighborhood of the corner portion is elastically deformed, then the sealing material can easily be pressed into the ant groove even without deforming the wide range of the sealing material, so the fitting operation becomes very easy. For uses such as gate valves of semiconductor apparatus which need a periodic exchange of sealing materials for ant grooves, the streamlining of the fitting operation and the reliability of the fitting are extremely useful in practical value.

In addition, because the straight bottom edge contacts with the bottom face of the ant groove across the wide range and because the repulsive force is generated when the shape of such as the sloping edge and the second projecting edge is elastically deformed, a strong contact face pressure can be generated at the bottom face of the ant groove. As a result, the sealing function can be enhanced, and the fixation force of the sealing material to the bottom face of the ant groove increases.

Particularly, near the corner portion between the straight bottom edge and the second projecting edge, an extremely high peak of the contact face pressure occurs to thus exercise the fixation force which acts as the strong resistance to the force of peeling off the sealing material from the bottom face of the ant groove. As a result, there is solved the problem such that the sealing material unfavorably slips out of the ant groove in the form of remaining fixing to the opposite member during the motion of releasing the sealing.

The ant groove is substantially trapezoidal shape in section, with the ant groove having an opening and a bottom opposite the opening, with the opening having a length running transversely to the sealing material, with the bottom having a length running transversely to the sealing material, and with the length of the bottom being greater than the length of the opening such that said ant groove is dovetail shaped in section.

The invention claimed is:

1. A sealing material for an ant groove that is fitted to the ant groove made in a surface of either one of a pair of members, that is in a joint place between these members and that makes contact with a surface of the member facing the ant groove, thereby sealing both of the members,
with the sealing material comprising:
an elastically deformable material; and
a sectional shape having: a straight bottom edge which is disposed on a bottom face of said ant groove, with said straight bottom edge having a first end and a second end; an arched convex edge which makes contact with the surface of said member facing said ant groove; a first projecting edge which connects with said first end of said straight bottom edge and projects obliquely outside from said first end of said straight bottom edge; a concave inlet portion which is located between said first projecting edge and said arched convex edge; a second projecting edge which connects with the second end of said straight bottom edge and is composed of straight lines, with the second projecting edge projecting obliquely outside from said second end of said straight bottom edge; a straight sloping edge of which one end connects directly with an end of said arched convex edge that is opposite to said first projecting edge and of which the other end connects directly with said second projecting edge; and a corner portion which is found in a connecting portion of said second projecting edge and said straight sloping edge;
wherein: when the sealing material for the ant groove is fitted to said ant groove, said concave inlet portion is disposed on an opening edge of the ant groove, and then an entirety of the sealing material for the ant groove is made to gyrate toward an inside of the ant groove around said concave inlet portion as a base point, so that the sealing material for the ant groove gets pressed into the ant groove in a state where a periphery of said corner portion is elastically deformed.

2. A sealing material for an ant groove according to claim 1, wherein a maximum value X of distances of from said corner portion to said concave inlet portion has a relationship of X/B=1.001-1.10 with an opening width B of said ant groove.

3. A sealing material for an ant groove according to claim 1 or 2, wherein:
said second projecting edge is formed by connecting a pair of straight edges together at an angle; and
another corner portion is disposed between said straight bottom edge and said second projecting edge; and still another corner portion is disposed between said pair of straight edges at an elbow place of said second projecting edge.

4. A sealing material for an ant groove according to claim 3, which:
further comprises a vertical edge connecting said arched convex edge and said concave inlet portion together; and
makes a clearance between said vertical edge and an opening edge of said ant groove when fitted to said ant groove.

5. A sealing material for an ant groove according to any one of claims 1 and 2, which:
further comprises a vertical edge connecting said arched convex edge and said concave inlet portion together; and
makes a clearance between said vertical edge and an opening edge of said ant groove when fitted to said ant groove.

6. A sealing material for an ant groove according to claim 1, wherein said ant groove is formed into a ring shape, and said sealing material is formed into a ring shape corresponding to said ring shaped ant groove, and is fitted to said ring shaped ant groove, with said ring shape having an outer peripheral side and an inner peripheral side, with the sealing material comprising:
a structure such that said first projecting edge and said concave inlet portion are located at the outer peripheral side of said ring shape;
a structure such that said second projecting edge, said straight sloping edge, and said corner portion are located at the inner peripheral side of said ring shape; and
a peripheral length extended by 1-10% in a state fitted to said ant groove of the ring shape when compared with a free state of said sealing material.

7. A sealing material according to either of claim 1 or 2 and in combination with said ant groove, wherein said ant groove comprises a substantially trapezoidal shape in section, with the ant groove having an opening and a bottom opposite the opening, with the opening having a length running transversely to the sealing material, with the bottom having a length running transversely to the sealing material, and with the length of the bottom being greater than the length of the opening such that said ant groove is dovetail shaped in section.

8. A sealing material for an ant groove that is fitted to the ant groove made in a surface of either one of a pair of members, that is in a joint place between these members and that makes contact with a surface of the member facing the ant groove, thereby sealing both of the members,
with the sealing material comprising:
an elastically deformable material; and
a sectional shape having: a straight bottom edge which is disposed on a bottom face of said ant groove, with said straight bottom edge having a first end and a second end; an arched convex edge which makes contact with the surface of said member facing said ant groove; a first projecting edge which connects with said first end of said straight bottom edge and projects obliquely outside directly from said first end of said straight bottom edge, with the first projecting edge being one of a) a convex edge; and b) a combination of a convex edge and a straight edge; a concave inlet portion which is located between said first projecting edge and said arched convex edge; a second projecting edge which connects with the second end of said straight bottom edge and is composed of straight lines, with the second projecting edge projecting obliquely outside directly from said second end of said straight bottom edge; a straight sloping edge of which one end connects directly with an end of said arched convex edge that is opposite to said first projecting edge and of which the other end connects directly with said second projecting edge; and at least one corner portion which is found in a range that extends from said straight bottom edge via said second projecting edge to said straight sloping edge;

wherein: when the sealing material for the ant groove is fitted to said ant groove, said concave inlet portion is disposed on an opening edge of the ant groove, and then an entirety of the sealing material for the ant groove is made to gyrate toward an inside of the ant groove around said concave inlet portion as a base point, so that the sealing material for the ant groove gets pressed into the ant groove in a state where a periphery of said corner portion is elastically deformed.

9. A sealing material for an ant groove that is fitted to the ant groove made in a surface of either one of a pair of members, that is in a joint place between these members and that makes contact with a surface of the member facing the ant groove, thereby sealing both of the members, with the sealing material comprising:

an elastically deformable material; and a sectional shape having: a straight bottom edge which is disposed on a bottom face of said ant groove, with said straight bottom edge having a first end and a second end; an arched convex edge which makes contact with the surface of said member facing said ant groove; a first projecting edge which connects with said first end of said straight bottom edge and projects obliquely outside directly from said first end of said straight bottom edge; a concave inlet portion which is located between said first projecting edge and said arched convex edge; a second projecting edge which connects with the second end of said straight bottom edge and projects obliquely outside directly from said second end of said straight bottom edge, with the second projection edge being one of a) a straight edge; and b) a combination of a pair of straight edges set at an angle to each other; a straight sloping edge of which one end connects directly with an end of said arched convex edge that is opposite to said first projecting edge and of which the other end connects directly with said second projecting edge; and at least one corner portion which is found in a range that extends from said straight bottom edge via said second projecting edge to said straight sloping edge;

wherein: when the sealing material for the ant groove is fitted to said ant groove, said concave inlet portion is disposed on an opening edge of the ant groove, and then an entirety of the sealing material for the ant groove is made to gyrate toward an inside of the ant groove around said concave inlet portion as a base point, so that the sealing material for the ant groove gets pressed into the ant groove in a state where a periphery of said corner portion is elastically deformed.

* * * * *